(12) United States Patent
Matsumura et al.

(10) Patent No.: US 8,583,707 B2
(45) Date of Patent: Nov. 12, 2013

(54) METHOD, COMPUTER PROGRAM, AND SYSTEM-MODEL CONVERTER FOR CONVERTING SYSTEM MODEL

(75) Inventors: Ikuo Matsumura, Kanagawa-ken (JP); Hisashi Miyashita, Kanagawa-ken (JP); Hideki Tai, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/133,961

(22) PCT Filed: Aug. 31, 2009

(86) PCT No.: PCT/JP2009/065224
§ 371 (c)(1),
(2), (4) Date: Sep. 27, 2011

(87) PCT Pub. No.: WO2010/067647
PCT Pub. Date: Jun. 17, 2010

(65) Prior Publication Data
US 2012/0011097 A1    Jan. 12, 2012

(30) Foreign Application Priority Data

Dec. 11, 2008  (JP) ................................ 2008-315655

(51) Int. Cl.
*G06F 17/30*  (2006.01)
(52) U.S. Cl.
USPC .................... 707/809; 707/606; 707/E17.056
(58) Field of Classification Search
CPC .................. G06F 17/30569; G06F 17/30592; G06F 17/30306; G06F 17/30418; G06F 17/30595; G06F 17/30286
USPC .................. 707/606, 809, E17.056, 999.102
See application file for complete search history.

(56) References Cited

U.S. PATENT DOCUMENTS 5,201,046 A *  4/1993  Goldberg et al. ...................... 1/1
6,477,538 B2 *  11/2002  Yaginuma et al. .................... 1/1
(Continued)

FOREIGN PATENT DOCUMENTS

CN   1543601 A   11/2004
CN   1873647 A   12/2006
(Continued)

OTHER PUBLICATIONS

Oracle White Paper, "Benefits of a Multi-Dimensional Model", May 2006, 23 pages, accessed online at <http://www.oracle.com/technetwork/developer-tools/warehouse/benefits.pdf> on Mar. 14, 2013.*

(Continued)

*Primary Examiner* — Phuong Thao Cao
(74) *Attorney, Agent, or Firm* — Scully, Scott, Murphy & Presser, P.C.; Vazken Alexanian

(57) ABSTRACT

A method, computer program, and system-model converter for converting system model. The method includes the steps of: receiving input of a conversion processing description about a structure of a multi-dimensional data model and extraction queries, where the multi-dimensional data model and the extraction queries extract at least one element from a plurality of model elements; and generating a hierarchical multi-dimensional data model from a graph model stored in a graph model storage unit on the basis of the inputted conversion processing description, where the hierarchical multi-dimensional data model includes dimensions having a hierarchical relationship.

14 Claims, 17 Drawing Sheets

(56) References Cited

U.S. PATENT DOCUMENTS

| | | | |
|---|---|---|---|
| 6,628,312 B1* | 9/2003 | Rao et al. | 715/853 |
| 6,704,740 B1* | 3/2004 | Lang | 1/1 |
| 7,080,067 B2* | 7/2006 | Nonomura et al. | 1/1 |
| 7,167,865 B1* | 1/2007 | Tharp et al. | 1/1 |
| 7,185,016 B1* | 2/2007 | Rasmussen | 1/1 |
| 7,231,386 B2* | 6/2007 | Nonomura et al. | 1/1 |
| 7,409,679 B2* | 8/2008 | Chedgey et al. | 717/144 |
| 7,580,944 B2* | 8/2009 | Zhuge et al. | 1/1 |
| 7,945,597 B2* | 5/2011 | Cras et al. | 707/803 |
| 7,970,795 B2* | 6/2011 | Kemp et al. | 707/802 |
| 8,239,778 B2* | 8/2012 | Sheth-Voss et al. | 715/763 |
| 2002/0091681 A1* | 7/2002 | Cras et al. | 707/3 |
| 2002/0143742 A1 | 10/2002 | Nonomura | |
| 2002/0198920 A1 | 12/2002 | Resnick et al. | |
| 2003/0158855 A1* | 8/2003 | Farnham et al. | 707/102 |
| 2004/0015783 A1* | 1/2004 | Lennon et al. | 715/523 |
| 2004/0205726 A1* | 10/2004 | Chedgey et al. | 717/125 |
| 2004/0215626 A1* | 10/2004 | Colossi et al. | 707/100 |
| 2005/0010386 A1* | 1/2005 | Tharp et al. | 703/13 |
| 2005/0010550 A1* | 1/2005 | Potter et al. | 707/1 |
| 2005/0076045 A1* | 4/2005 | Stenslet et al. | 707/101 |
| 2005/0114763 A1 | 5/2005 | Nonomura | |
| 2005/0192926 A1* | 9/2005 | Liu et al. | 707/1 |
| 2005/0283494 A1* | 12/2005 | Colossi et al. | 707/102 |
| 2006/0079983 A1* | 4/2006 | Willis | 700/108 |
| 2007/0088689 A1* | 4/2007 | Cras et al. | 707/4 |
| 2007/0130180 A1* | 6/2007 | Rasmussen | 707/100 |
| 2007/0234237 A1* | 10/2007 | Seemann | 715/853 |
| 2008/0027970 A1* | 1/2008 | Zhuge et al. | 707/102 |
| 2008/0195643 A1* | 8/2008 | Sheth-Voss et al. | 707/101 |
| 2008/0270451 A1* | 10/2008 | Thomsen et al. | 707/102 |
| 2008/0270462 A1* | 10/2008 | Thomsen | 707/103 R |
| 2009/0006150 A1* | 1/2009 | Prigge et al. | 705/7 |
| 2009/0007056 A1* | 1/2009 | Prigge et al. | 717/104 |
| 2009/0193050 A1* | 7/2009 | Olson | 707/102 |
| 2009/0265375 A1* | 10/2009 | Zhuge et al. | 707/102 |
| 2010/0153874 A1* | 6/2010 | McKinney | 715/781 |
| 2011/0074786 A1* | 3/2011 | Aggarwal | 345/440 |
| 2011/0209081 A1* | 8/2011 | Chen et al. | 715/771 |

FOREIGN PATENT DOCUMENTS

| | | |
|---|---|---|
| JP | 05-274348 | 10/1993 |
| JP | 06-250896 | 9/1994 |
| JP | 2000-267906 | 9/2000 |
| JP | 2002-297602 A | 10/2002 |
| JP | 2009-134748 | 6/2009 |
| WO | WO2007/088982 | 8/2007 |

OTHER PUBLICATIONS

Chen et al., "Graph OLAP: a Multi-Dimensional Framework for Graph Data Analysis", Knowledge Information System, Aug. 2009, 23 pages, accessed online at <http://www.cs.ucsb.edu/~xyan/papers/kais09_golap.pdf> on Mar. 14, 2013.*

Chinese Office Action dated Oct. 29, 2012 issued in 200980149491.3.

* cited by examiner

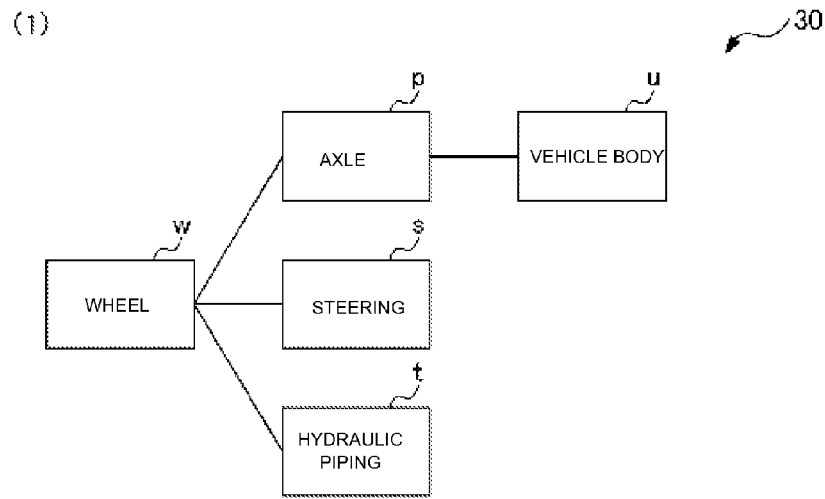
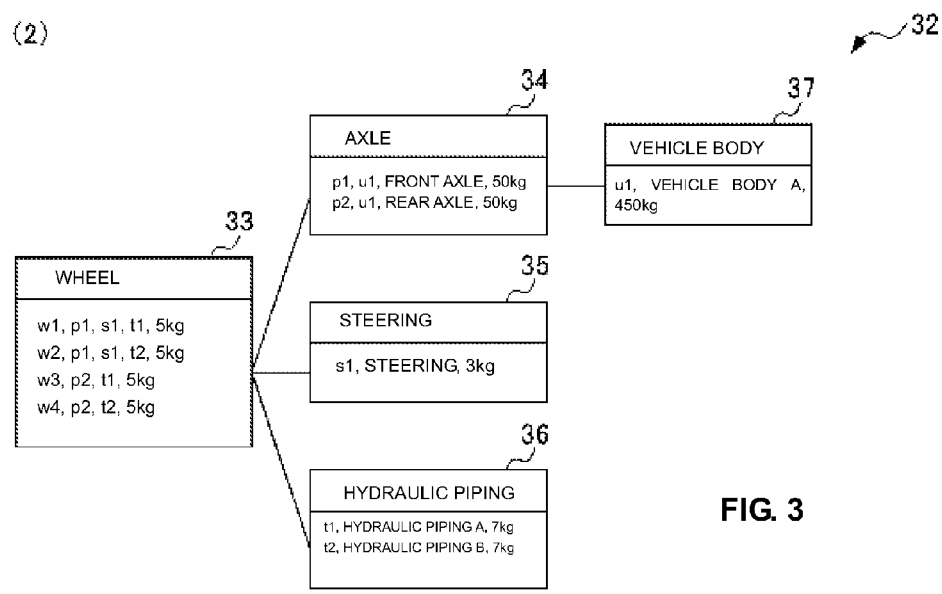
FIG. 3

| BLOCK TABLE | BLOCK EXTRACTION QUERY Q |
|---|---|
| WHEEL | $Qb =$ "w*" |
|  | $Qp =$ {id, weight} |
| AXLE | $Qb =$ "p*" |
|  | $Qp =$ {id, name, weight} |
| STEERING | $Qb =$ "s*" |
|  | $Qp =$ {id, name, weight} |
| HYDRAULIC PIPING | $Qb =$ "t*" |
|  | $Qp =$ {id, name, weight} |
| VEHICLE BODY | $Qb =$ "u*" |
|  | $Qp =$ {id, name, weight} |

FIG. 4

| WHEEL ID | WHEEL WEIGHT | AXLE ID | AXLE NAME | AXLE WEIGHT | STEERING ID | STEERING NAME | STEERING WEIGHT | HYDRAULIC PIPING ID | HYDRAULIC PIPING NAME | HYDRAULIC PIPING WEIGHT | VEHICLE BODY ID | VEHICLE BODY | VEHICLE BODY WEIGHT |
|---|---|---|---|---|---|---|---|---|---|---|---|---|---|
| W1 | 5 | p1 | FRONT AXLE | 50 | s1 | STEERING | 3 | t1 | HYDRAULIC PIPING A | 7 | u1 | VEHICLE BODY A | 450 |
| W2 | 5 | p1 | FRONT AXLE | 50 | s1 | STEERIN~ | 3 | t2 | HYDRAULIC PIPING B | 7 | u1 | VEHICLE BODY A | 450 |
| W3 | 5 | p2 | REAR AXLE | 50 | NULL | NULL | NULL | t1 | HYDRAULIC PIPING A | 7 | u1 | VEHICLE BODY A | 450 |
| W4 | 5 | p2 | REAR AXLE | 50 | NULL | NULL | NULL | t2 | HYDRAULIC PIPING B | 7 | u1 | VEHICLE BODY A | 450 |

FIG. 6

| BLOCK TABLE | VIEW UPDATE RULE |
|---|---|
| WHEEL | True |
| AXLE | True |
| STEERING | False |
| HYDRAULIC PIPING | False |
| VEHICLE BODY | False |

FIG. 7

- Bwidths OF SWC AND BUS ARE NECESSARY BANDWIDTH AND ACCEPTABLE BANDWIDTH, RESPECTIVELY.
- ITALIC BODY INDICATES EXTERNAL KEY

| | SWCs | | | Confs | | | BUSes | | |
|---|---|---|---|---|---|---|---|---|---|
| id | name | bwidth | ... | id | name | ... | id | name | bwidth | ... |
| 1 | SWC1 | 20 | ... | 1 | Conf1 | ... | 1 | BUS1 | 50 | ... |
| 2 | SWC2 | 30 | ... | 2 | Conf2 | ... | 1 | BUS1 | 50 | ... |
| 3 | SWC3 | 25 | ... | 3 | Conf3 | ... | 2 | BUS2 | 100 | ... |
| 4 | SWC4 | 35 | ... | 4 | Conf4 | ... | 2 | BUS2 | 100 | ... |
| 5 | SWC5 | 50 | ... | 5 | Conf5 | ... | 2 | BUS2 | 100 | ... |
| 6 | ... | | | ... | | | | | | |

Range 1 (CELL RANGE)

RANGE IS NARROWED DOWN IN TABLE

FIG. 16

EXAMPLE OF CONSTRAINT DESCRIPTION REFERRING TO PRESENTED TABLE: "SUM (*Range1*) < 100"

METHOD, COMPUTER PROGRAM, AND SYSTEM-MODEL CONVERTER FOR CONVERTING SYSTEM MODEL

CROSS-REFERENCE TO RELATED APPLICATION

This application is a U.S. National Stage entry under 35 U.S.C. §371 based on International Application No. PCT/JP2009/065224, filed Aug. 31, 2009, which was published under PCT Article 21(2) and which claims priority to Japanese Patent Application No. 2008-315655, filed Dec. 11, 2008.

BACKGROUND OF THE INVENTION

1. Field of the Invention

The present invention relates to a system-model conversion method, a computer program, and a system-model converter for converting a system model.

2. Description of the Related Art

As for a case of describing a system model of software or a manufacturing industry in a cross-sectional way from multiple viewpoints, it is known that a larger scale of model elements involved therein makes an extraction work for the cross-sectional descriptions less efficient. For example, several methods of formally describing constraints have been heretofore proposed. However, it becomes more difficult to efficiently analyze and edit constraints as the number of the constraints becomes larger. Use of any of PD (Parametric Diagrams) of SysML (Systems Modeling Language), Visual OCL and Constraint Diagrams which are general-purpose graphical modeling languages enables relationships between constraints and system components that should meet the constraints to be described visually using blocks and links. However, in a case of describing the constraints for a large number of system components, the diagram ends up having so many blocks and links and becomes complicated so much that it is difficult to analyze and edit the constraints effectively. Nowadays, systems increasingly large in scale and high in complexity are built. Therefore, it is important to analyze and edit a large number of model elements in a hierarchical way based on multiple viewpoints.

OLAP (Online Analytical Processing) is known as one of methods of analyzing a huge amount of data. OLAP is a method of analyzing data by developing a multi-dimensional data model of a relational data structure with use of snapshots thereof, and is naturally defined as having final analysis results deployed into a Table/Matrix format. OLAP has been widely used in various kinds of analysis in actual operations, and the method has been established. Viewed from the opposite side, the efficient analysis method that handles a large amount of data using the table format is considered to be promising in the field of the system description.

However, most languages, such as SysML for a system description, Autosar (Registered Trademark) (Automotive Open System Architecture) which is a standard for a vehicle built-in software description, Simulink (Registered Trademark) which is commonly used for a control system description has as a basic data model a generic graph structure, which is not a data structure in a relational format. Thus, in order to pursue analysis in a Table/Matrix format, the two data models must be associated with each other properly.

Various methods have been disclosed for making associations between the relational model and the graph model having a graph structure. The network-database enquiry control system disclosed in Japanese Patent Application Publication No. 5-274348 refers to external schema information that defines, using a set, each relationship between records in the network database and internal schema information that defines the format for storing the network database in a storage device, and thereby generates network model information consisting of column information and set information in the relational database. On the basis of the network model information and the enquiry to the relational database, the network-database enquiry control system performs an enquiry to the network database.

The association information converter described in Japanese Patent Application Publication No. 6-250896 includes: input means for inputting a data structure of association information for database; attribute expression storage means for storing therein the information from the input means in the format of an association information expression in a metric space such as an n-dimensional Euclidean space; graph expression storage means for storing therein the information from the input means in the format of an association information expression in a graph structure consisting of nodes and arcs; attribute-expression/graph-expression conversion means for converting the information stored in the attribute expression storage means into the information stored in the graph expression storage means or vice versa; and output means for outputting information stored in the attribute expression storage means or the information stored in the graph expression storage means as the data structure of association information.

The database-model conversion method described in Japanese Patent Application Publication No. 2000-267906 generates tables corresponding to respective groups in a database of a network model, appends the parent-child association information and order information to a child record of a child group, and then stores the record in a child table.

However, the systems disclosed in Patent Literatures 1 to 3 and the like are not given the information on relationships between tables in the relational database obtained by the model conversion. For this reason, the systems described in Patent Literatures 1 to 3 and the like are incapable of operation such as generation of the relational models in a hierarchical way based on multiple viewpoints, and thereby do not facilitate the analysis and editing of a system model.

It is an object of the present invention to provide a system-model conversion method, a computer program, and a system-model converter which facilitate analysis and editing of a system model by using information indicating a hierarchical relationship.

SUMMARY OF THE INVENTION

According to a first aspect of the present invention, a computer including a graph model storage unit for storing therein a graph model which is the system model having a graph-type data structure and including multiple model elements receives input of a conversion processing description including a description about a structure of a multi-dimensional data model and extraction queries each of which is for extracting any of the model elements. Note that the graph model can be described in a language such as SysML. The graph model is obtained by modeling at least one of a structure, a behavior (operation), and a constraint. Then, the computer generates the multi-dimensional data model in which dimensions have a hierarchical relationship, from the graph model stored in the graph model storage unit on the basis of the inputted conversion processing description. The structure of the multi-dimensional data model is one to which a snowflake schema is applied.

According to a second aspect of the present invention, in addition to the first aspect, the computer in advance specifies, among the multiple model elements forming the graph model, the model element corresponding to a root block table which is a center table of the multi-dimensional data model. Then, the computer generates the multi-dimensional data model by use of the model elements extracted by applying the extraction queries in turn to each block table associated with the specified root block table and another block table associated with the each block table, while applying the extraction queries to each associated block table as long as such associated block table exists.

According to a third aspect of the present invention, in addition to the first aspect, the computer generates a tabular view from the generated multi-dimensional data model and outputs the generated tabular view. Note that the computer receives filtering information for specifying specific information to be outputted and thereby can output the tabular view corresponding to the filtering information. In addition, when the tabular view is changed by a user, the computer receives change information and further receives the input of the conversion processing description including a description of a view update rule which represents rules of multi-dimensional data model update. Thereby, the computer reflects the received change information in the multi-dimensional data model according to the change processing description. Further, the computer reflects the received change information in the graph model according to the conversion processing description.

According to a fourth aspect of the present invention, in addition to the third aspect, the computer receives a constraint expression description based on the tabular view outputted in the step of outputting the tabular view and thereby updates the graph model stored in the graph model storage unit on the basis of the received constraint expression description by use of a predefined association rule for associating the multi-dimensional data model and the graph model with each other.

In addition, as another aspect, the present invention can also be provided as a computer program that causes the computer to execute the steps of the method described above. Further, as another mode, the present invention can also be provided as an apparatus that executes the method described above.

EFFECTS OF THE INVENTION

The present invention can provide the system model conversion method, the computer program, and a system model converter. The computer includes the graph model storage unit for storing therein a graph model which is the system model having a graph-type data structure and including multiple model elements. The method includes the steps of: receiving input of a conversion processing description including a description about a structure of a multi-dimensional data model and extraction queries each of which is for extracting any of the model elements; and generating the multi-dimensional data model in which dimensions have a hierarchical relationship, from the graph model stored in the graph model storage unit on the basis of the inputted conversion processing description. Thus, the multi-dimensional data model dimensions of which are hierarchically arranged is generated from the graph model consisting of many model elements, thereby the analysis and editing of a system model can be facilitated, and thus the analysis and the editing of many model elements can be performed hierarchically from multiple viewpoints.

BRIEF DESCRIPTION OF THE DRAWINGS

FIG. 3 shows a diagram illustrating examples of: a structure of a multi-dimensional data model according to the embodiment of the present invention; and a table corresponding to the structure.

FIG. 4 shows a table illustrating an example of a block extraction query according to the embodiment of the present invention.

FIG. 6 shows a table illustrating an example of a tabular view according to the embodiment of the present invention.

FIG. 7 shows a table illustrating an example of a view update rule according to the embodiment of the present invention.

FIG. 16 shows a table illustrating an example of a table according to the embodiment of the present invention.

DETAILED DESCRIPTION OF THE PREFERRED EMBODIMENTS

An embodiment of the present invention is described below with reference to the drawings. The embodiment is merely exemplary and the technical scope of the present invention is not limited thereto.

Overall Configuration

Figure 1:
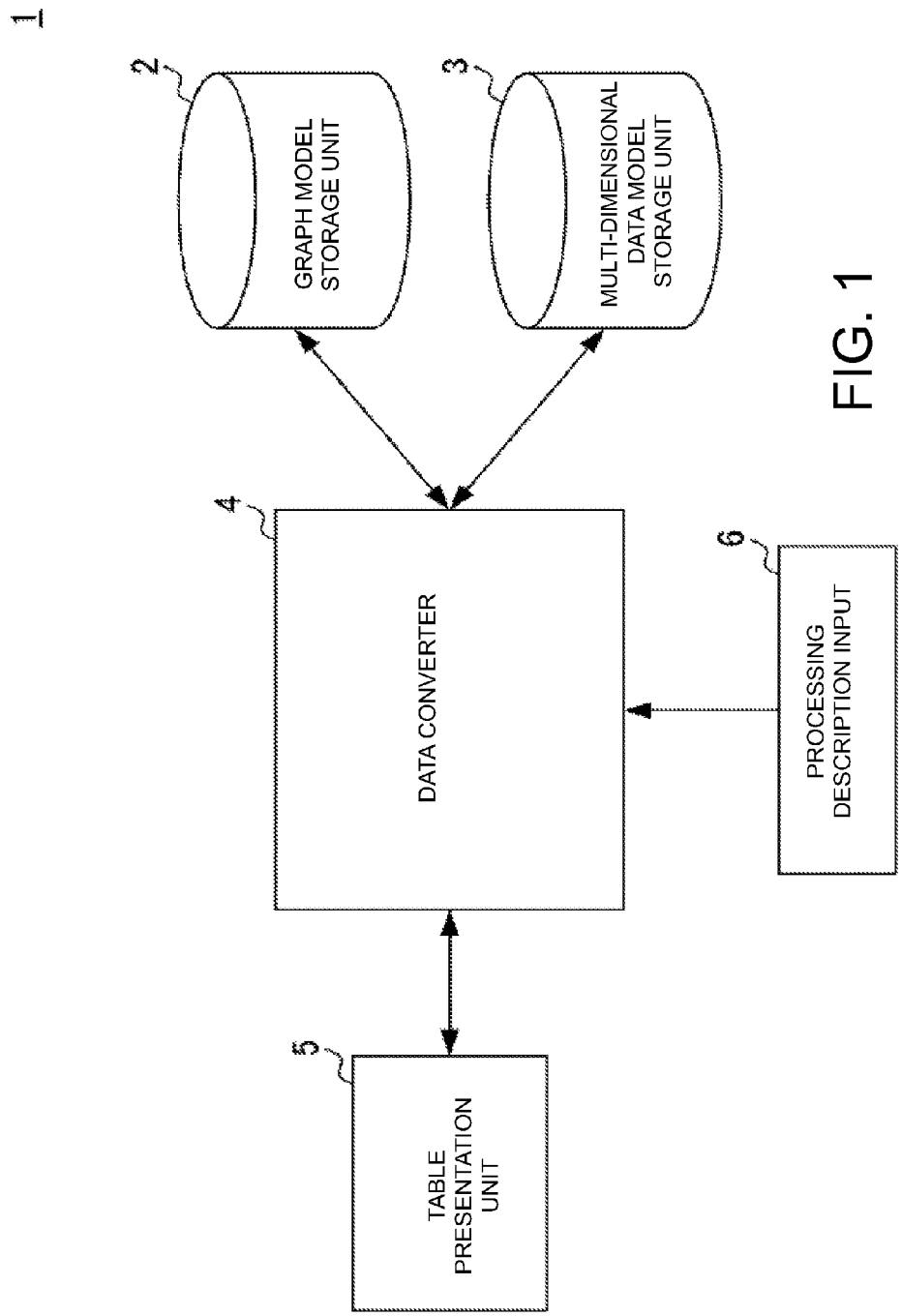
FIG. 1 shows a diagram illustrating an overall configuration of a model converter according to an embodiment of the present invention.

FIG. 1 is a diagram illustrating an overall configuration of a model converter according to this embodiment. The model converter 1 includes a graph model storage unit 2, a multi-dimensional data model storage unit 3, a data converter 4, a table presentation unit 5 and a processing description input unit 6.

The graph model storage unit 2 stores therein a system model (i.e., graph model) in SysML, UML (Unified Modeling Language) or the like, having a graph-type data structure (also referred to as a graph structure) and consisting of models of structures, behaviors and constraints of a target system. Note that the behaviors of a system indicate operations and state transitions.

The multi-dimensional data model storage unit 3 stores therein a multi-dimensional data model that is generated from a system model of the graph model storage unit 2 and the conversion processing description received from the processing description input unit 6.

The data converter 4 is a controller that generates, from the system model stored in the graph model storage unit 2, a multi-dimensional data model storable in the multi-dimensional data model storage unit 3. In addition, the data converter 4 generates, from the multi-dimensional data model, a tabular view in which pieces of information needed by a user are listed in a table format. Furthermore, when the tabular view is changed, the data converter 4 reflects the change in the multi-dimensional data model stored in the multi-dimensional data model storage unit 3 and a system model stored in the graph model storage unit 2. Furthermore, the data converter 4 refers to the tabular view and updates, on the basis of information of the constraint expression and the like described therein, the system model stored in the graph model storage unit 2.

The table presentation unit 5 is an output controller that outputs a tabular view created by the data converter 4. Further, in response to change of the outputted tabular view by user's operation, the table presentation unit 5 receives change information. Furthermore, the table presentation unit 5 refers to the tabular view and receives information on the constraint expression described by the user.

The processing description input unit 6 receives a structure of an n-dimensional data model and its appended information as information on a converting processing description, of a system, which has been inputted by a designer. The appended information indicates additional information to a structure of the n-dimensional data model, which is a model element extraction query that specifies a model element to be extracted from a graph structure system model and a view update rule that defines update of the n-dimensional data model. The details of each function are described later.

Figure 2:
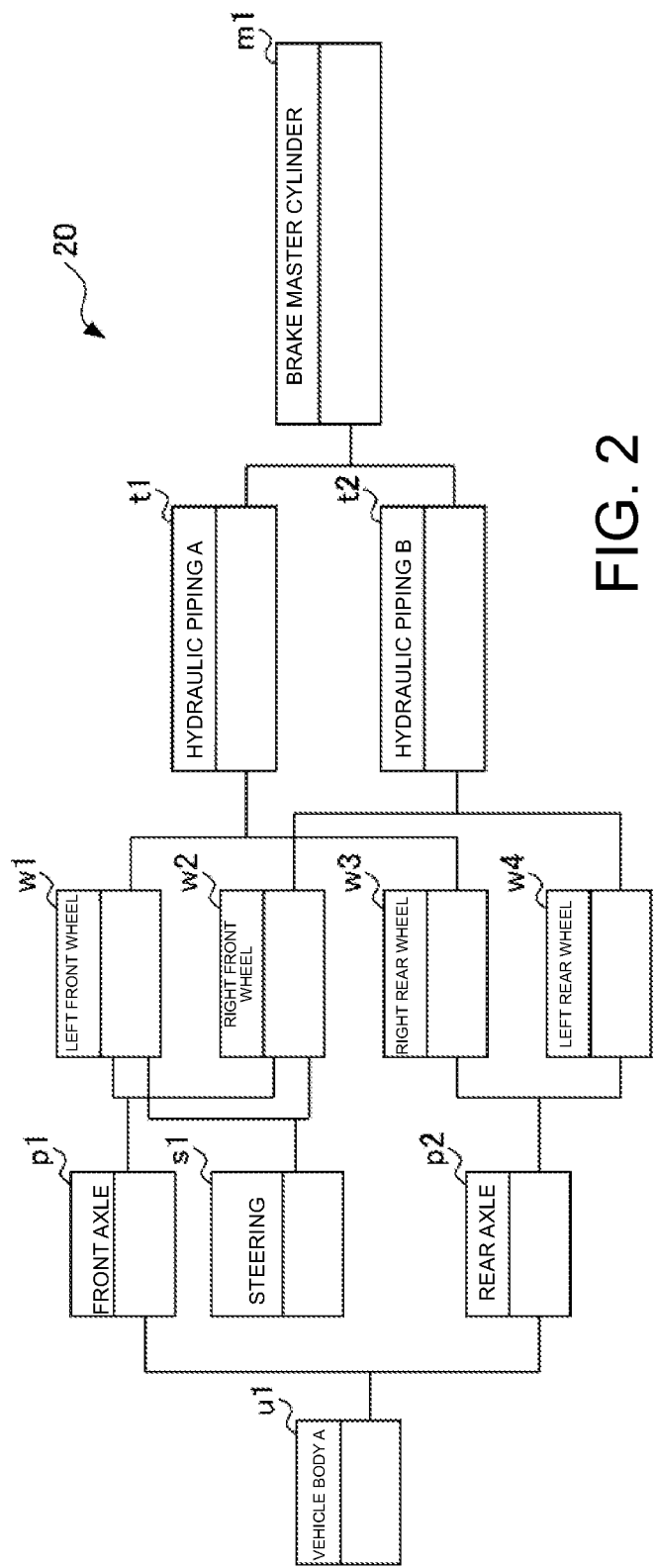
FIG. 2 shows a diagram illustrating an example of a system model according to the embodiment of the present invention.

FIG. 2 is a diagram illustrating an example of a system model according to this embodiment. FIG. 3 is a diagram illustrating an example of a structure and a table corresponding to the structure of a multi-dimensional data model.

Exemplary System Model

FIG. 2 illustrates a graph model 20, which is a system model having a graph-type data structure of a wheel of an FF-vehicle/X-piping arrangement dual hydraulic system brake. The graph model 20 shows that two blocks (model elements) of a left front wheel w1 and a right front wheel w2 are connected to each of a block of a front axle p1 and a block of a steering s1, and that two blocks of a right rear wheel w3 and a left rear wheel w4 are connected to a rear axle p2. Further, the graph model 20 shows that two blocks of brake hydraulic pipings: a hydraulic piping A (t1) and a hydraulic piping B (t2) are included in consideration of redundancy for a mechanical failure. As for the blocks of the two brake hydraulic pipings, which are the hydraulic piping A (t1) and the hydraulic piping B (t2), the block of the hydraulic piping A (t1) is connected to the block of the left front wheel w1 and the block of the right rear wheel w3 while the block of the hydraulic piping B (t2) is connected to the block of the right front wheel w2 and the block of the left rear wheel w4, thereby each hydraulic piping is connected exclusively to one of the front wheels and one of the rear wheels. The graph model 20 shows that the blocks of the front axle p1 and the rear axle p2 are connected to a block of a vehicle body Au1 while the hydraulic piping A (t1) and the hydraulic piping B (t2) are connected to a block of a brake master cylinder m1, whereby the blocks are connected to their upper-level blocks. Note that although illustration is omitted in FIG. 2, each of the blocks of the left front wheel w1, the right front wheel w2, the right rear wheel w3, the left rear wheel w4 and the like in the figure has properties such as a weight and a name.

The graph model 20 in FIG. 2 is stored in advance in the graph model storage unit 2. The following describes an example of generating a multi-dimensional data model from the graph model 20.

Exemplary Structure of Multi-Dimensional Data Model

Part (1) of FIG. 3 illustrates a structure 30 of a multi-dimensional data model. The structure 30 is information needed for generation of a multi-dimensional data model and is given by the designer through the processing description input unit 6 by referring to the graph model 20 illustrated in FIG. 2. The structure 30 illustrated in Part (1) of FIG. 3 is a schema for analyzing the graph model 20 in FIG. 2 from three different viewpoints, namely, from the axle p, the steering s and the hydraulic piping t with the wheel w viewed as the center. As the axle p includes a vehicle body u thereunder, the analysis can be carried out in a hierarchical way from the wheel w, axle p to vehicle u. The structure 30 is configured in such a manner that the dimensions connected to the wheel w are spread over around the wheel w hierarchically and radially. Thus, such a schema like the structure 30 whose dimensions are spread over around the wheel w hierarchically and radially is called a snowflake schema.

Exemplary Table Corresponding to Multi-dimensional Data Model

Part (2) of FIG. 3 illustrates an example of a table 32 corresponding to the structure 30 of the multi-dimensional data model. The table 32 includes a root block table 33, block tables 34 to 37. The creation of the table 32 is equivalent to the creation of the multi-dimensional data model, i.e., the table 32 represents a multi-dimensional data model. The root block table 33 is a fact table in the snowflake schema and is a set of blocks where the wheel w is the center in the analysis and editing. In this embodiment, the wheel w is a set of blocks which is the center in the analysis and editing. The block tables 34 to 37 are dimensional tables in the snowflake schema while the root block table 33 in the center maintains a set of blocks associated with each other in the system model.

Appended Information Example 1

Next, a description is given of the extraction query which is information needed for generating the table 32 and is the appended information inputted by the designer to the processing description input unit 6. FIG. 4 is a table illustrating an example of a block extraction query Q according to this embodiment. The block extraction query Q is given to each block table of the multi-dimensional data model by the designer. The block extraction query Q is a query for specifying which block is to be extracted as a record of the targeted block table from the graph-structured system model, e.g., the graph model 20 or the like. The block extraction query Q is formed of Q=(Qb, Qp). The query Qb is used for extracting a block. The query Qb is assumed to be a local query. Thus, the query Qb is such a query that, given a local single block, it is possible to determine whether the block matches the query Qb. For example, a regular expression or pattern that matches a name of a block to be extracted is conceivable as such a language. When blocks associated with the root block table are to be extracted, the global query is applied to the entire model.

As for a block table other than the root block table, a query is applied only to every block that can be traced from the block extracted at a parent level (here, a term in a parent-child relationship where the snowflake schema is considered as a tree structure is used). Thus, the query of a block other than the root block table can be implemented as a context-dependent query. The context-dependent query indicates that the query can be applied by sequentially tracing all the blocks at a child level and below as long as there is a connected link. Since the range of tracing can be determined by performing a context-dependent query as described above, the context query made by the model converter 1 is efficient in practical use.

The query Qp determines which property is to be extracted from the block that is extracted with the query Qb. As the property, for example, a set of property names is conceivable.

Multi-Dimensional Data Model Creation Flowchart

Figure 5:
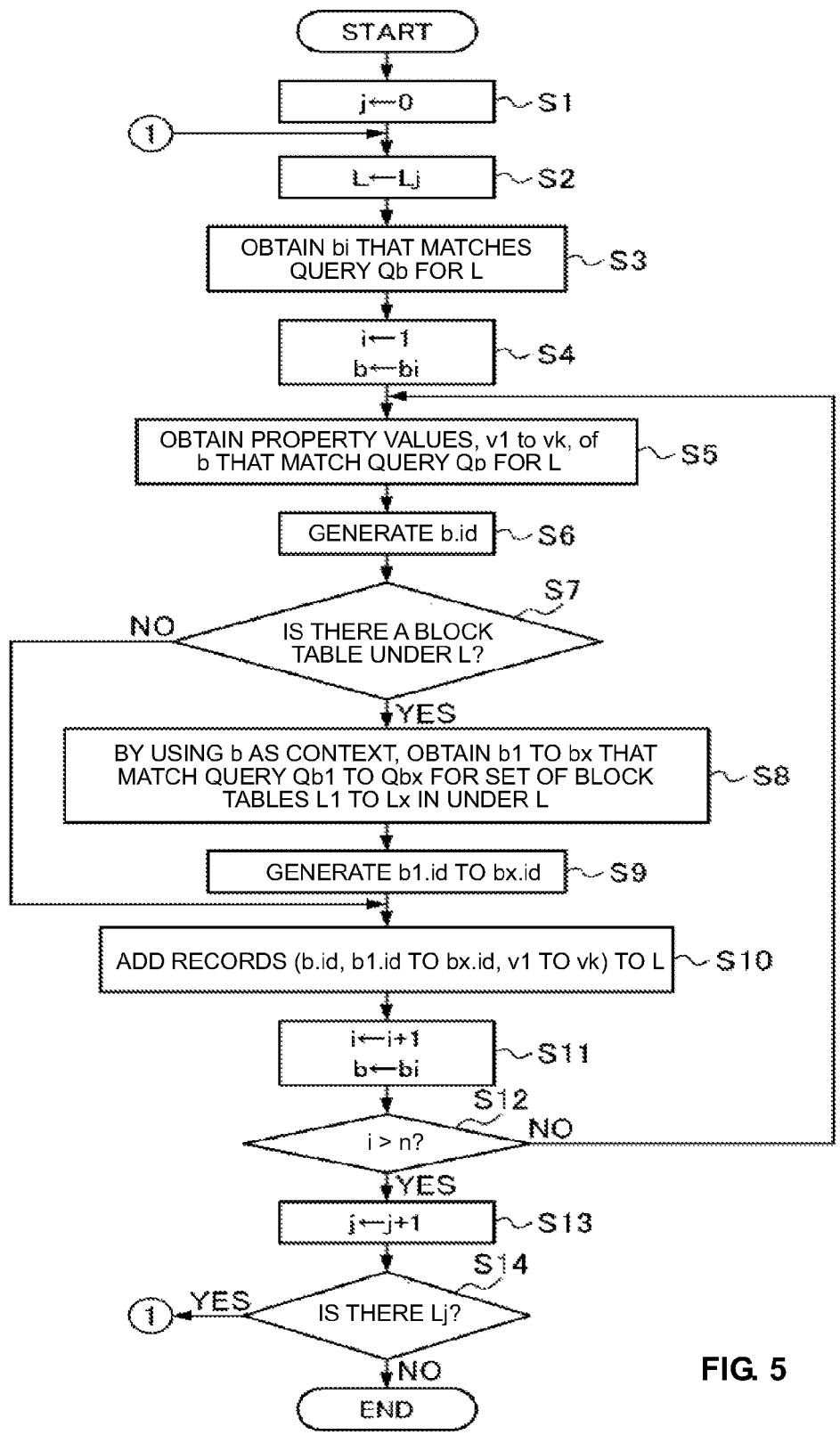
FIG. 5 shows a flowchart of creating a multi-dimensional data model according to the embodiment of the present invention.

Next, a description is given of a process in which the contents of the dimensional tables of a snowflake schema are extracted from the graph-structured system model. FIG. 5 is a flowchart of creating a multi-dimensional data model according to this embodiment. Note that the following processes are controlled by the data converter 4.

In Step S1, 0 is assigned to an integer j. In Step S2, the block table Lj is set as a block table L. The block table L0 is a root block table.

In Step S3, with use of the query Qb for the block table L, all the blocks bi (i=1 to n (n: integer)) matching the query Qb are extracted. Note that the query Qb is one of the block extraction queries Q and is used for extracting a block bi. In Step S4, 1 is assigned to the integer i, and the block bi is set as the block b.

In Step S5, a property value v (v1, ..., vk) of the block b which matches the query Qp for the block table L is extracted. An integer k equivalent to the number of the property value v is dependent on the query Qp.

In Step S6, b.id is generated as an ID (identifier) of the block b in the block table L.

In Step S7, it is determined whether or not a block table exists under the block table L. If there is a block table under the block table L (Step S7: YES), the process proceeds to Step S8. On the other hand, if there is no block table under the block table L (Step S7: NO), the process proceeds to Step S10.

In Step S8, with the block b being a context, the queries Qb1, ..., Qbx for a set of block tables L1, ..., Lx (at a child level) under the block table L are used for obtaining the blocks b1, ..., bx matching the queries Qb1, ..., Qbx. Note that the integer x is equal to or larger than one.

In Step S9, b1.id, ..., bx.id are generated as IDs for the block table L1, ..., the block table Lx of the block b1, ..., the block bx.

In Step S10, the records (b.id, b1.id, ..., bx.id, v1, ..., vk) are added to the block table L. It should be noted that the IDs b1.id, ..., bx.id exist only if there are the block tables L1, ..., Lx under the block table L.

In Step S11, a value of i plus 1 is assigned to the integer i, and the block bi is set as the block b. In Step S12, it is determined whether or not the integer i is larger than the integer n. The integer n is the number of blocks matching the query Qb obtained in Step S3. If the integer i is larger than the integer n (Step S12: YES), the process proceeds to the Step S13. If the integer i is equal to or smaller than the integer n (Step S12: NO), the process proceeds to Step S5.

In Step S13, a value of j plus 1 is assigned to the integer j. In Step S14, it is determined whether or not there is the block table Lj. If there is a block table Lj (Step S14: YES), the process proceeds to Step S2. On the other hand, if there is no block table Lj (Step S14: NO), the process ends.

Throughout the series of processes, a user inputs and gives a structure of a multi-dimensional data model and a query to extract a model element, and thereby the data converter 4 can automatically generate, from a system model with a graph-type data structure, a multi-dimensional data model in which dimensions are arranged hierarchically.

Example Application of Flowchart of Multi-Dimensional Data Model Generation

Next, a description is given of an example of generating a multi-dimensional data model by use of the flowchart illustrated with FIG. 5. In this example, from the graph model 20 in FIG. 2, the table 32 of the Part (2) of FIG. 3 is generated by using the structure 30 in Part (1) of FIG. 3 received by the processing description input unit 6 and the block extraction query Q in FIG. 4 storable in the multi-dimensional data model storage unit 3.

Firstly, with reference to the structure 30 of Part (1) of FIG. 3, the data converter 4 performs processes on the wheel w of the root block table (Steps S1 and S2 in FIG. 5). The query Qb for the wheel w is "Qb=w*" according to FIG. 4. This means that blocks starting with "w" are extracted. Accordingly, the data converter 4 extracts four blocks in total: the left front wheel w1, the right front wheel w2, the right rear wheel w3 and the left rear wheel w4 in FIG. 2 (Step S3 in FIG. 5).

The processes on the block of the left front wheel 1 are then performed (Step S4 in FIG. 5). The weight of the left front wheel w1 is obtained as a property of the block of the left front wheel w1 matching the query Qp for the wheel w (Step S5 in FIG. 5). Incidentally, this example assumes that the weight, to be illustrated in the graph model 20, of each of the left front wheel w1, the right front wheel w2, the right rear wheel w3, and the left rear wheel w4 is 5 kg. Then, "w1" is generated as an id of the left front wheel w1 (Step S6 in FIG. 5).

According to Part (1) of FIG. 3, there are three block tables under the wheel w: the axle p, the steering s, and the hydraulic piping t (Step S7 in FIG. 5: YES). The block of the left front wheel w1 is used as a context to obtain the blocks of the front axle p1, the steering s1, and the hydraulic piping A (t1) matching the query Qb (see FIG. 4) for the axle p, the steering s, and the hydraulic piping t (Step S8 in FIG. 5). Then, "p1, s1, t1" are generated as ids of the blocks of the front axle p1, the steering s1, and the hydraulic piping t1 (Step S9 in FIG. 5). The record (w1, p1, s1, t1, 5 kg) is added to the wheel w (Step S10 in FIG. 5).

Then, the processes for the block of the right front wheel w2 is performed similarly to the process for the block of the left front wheel w1 (Step S12 in FIG. 5: NO). To begin with, the weight is obtained as the property of the block of the right front wheel w2 matching the query Qp for the wheel w. Then, the block of the right front wheel w2 is used as a context to obtain the blocks of the front axle p1, the steering s1, and the hydraulic piping B (t2) matching the query Qb for the axle p, the steering s, and the hydraulic piping t (Step S8 in FIG. 5). Thus, the record (w2, p1, s1, t2, 5 kg) is obtained.

Similarly, the record (w3, p2, t2, 5 kg) is obtained for the block of the right rear wheel w3, and the record (w4, p2, t2, 5 kg) is obtained for the block of the left rear wheel w4. Thus, as illustrated in the root block table 33 of the table 32 in Part (2) of FIG. 3, those records are inserted into the root block table 33.

Next, the process is performed on the axle p which is a block table under the wheel was the root block table (YES in Step S14 in FIG. 5). The query Qb for the axle p is "Qb=pt" according to FIG. 4. This means that blocks starting with "p" are extracted. Accordingly, the data converter 4 extracts two blocks in total: the front axle p1 and the rear axle p2 in FIG. 2 (Step S3 in FIG. 5).

The processes for the block of the front axle p1 are then performed (Step S4 in FIG. 5). The name and the weight of the front axle p1 is obtained as a property of the block of the front axle p1 matching the query Qp for the axle p (Step S5 in FIG. 5). Incidentally, this example assumes that the weight, to be illustrated in the graph model 20, of each of the front axle p1 and the rear axle p2 is 50 kg. Then, "p1" is generated as an id of the front axle p1 (Step S6 in FIG. 5).

There is a block table of a vehicle body u under the axle p (Step S7 in FIG. 5: YES). Thus, the block of the front axle p1 is used as a context to obtain the block of vehicle body Au1 matching the query Qb (see FIG. 4) for the vehicle body u (Step S8 in FIG. 5). Then, "u1" is generated as an id of the block of the vehicle body Au1 (Step S9 in FIG. 5). The record (p1, u1, the front axle, 50 kg) is added to the axle p. Similarly, the record (p2, u1, rear axle, 50 kg) is obtained for the block of the rear axle p2. Thus, as illustrated in the block table 34 in Part (2) of FIG. 3, the record is inserted into the block table 34.

Similarly, the processes for the steering s, the hydraulic piping t, and the vehicle body u are performed to generate the table 32 illustrated in Part (2) of FIG. 3. As described above, by using the algorithm of the flowchart in FIG. 5 the table 32 can be generated which includes the root block table 33 and the block tables 34 to 37 having the records inserted thereinto, as illustrated in Part (2) of FIG. 3.

Example of View

FIG. 6 is a table illustrating an example of a tabular view 60 according to this embodiment, which is presented to the user. After the table 32 of the multi-dimensional data model is generated by the processes as described above, the data converter 4 can generate a tabular data structure illustrated in FIG. 6 by joining (joining) the root block table 33 and the block tables 34 to 37 included in the table 32 together. The generated tabular data structure is the tabular view 60.

The tabular view 60 is presented to the user by the table presentation unit 5. The user can refer to the tabular view 60 and update the value of the tabular view 60. The tabular view 60 is presented to the user in such a manner that the user can easily handle the data, thus being capable of facilitating the analysis and editing by the user. For example, it is possible to extract the information needed for the user by specifying items of interests or the contents thereof as filtering information by the user.

Appended Information Example 2

Next, a description is given of the view update rule which is additional information needed for reflecting user's update in the graph model 20 and the table 32 in a case where the tabular view 60 is updated by the user. FIG. 7 is a table illustrating an example of a view update rule UR according to this embodiment. The view update rule UR is inputted to each block table through the processing description input unit 6 by the designer. The view update rule UR is given to each block table. The view update rule UR is a flag by which it is determined whether or not the targeted block is to be copied or deleted in a case where the user performs an operation for addition or deletion of a row, and the view update rule UR is expressed with a truth or false value. If the view update rule UR is "True", the corresponding block is copied upon the insertion of a row, and the corresponding block is deleted upon the deletion of a row. If the view update rule UR is "False", the corresponding block is not copied nor deleted upon the insertion or deletion of a row. Although there is a case where the same item is displayed in multiple cells of the tabular view 60 due to the processes based on the view update rule UR, this means that actually the items refer to the same block.

Flowchart of Multi-Dimensional Data Model Update Due to View Change

Figure 8:
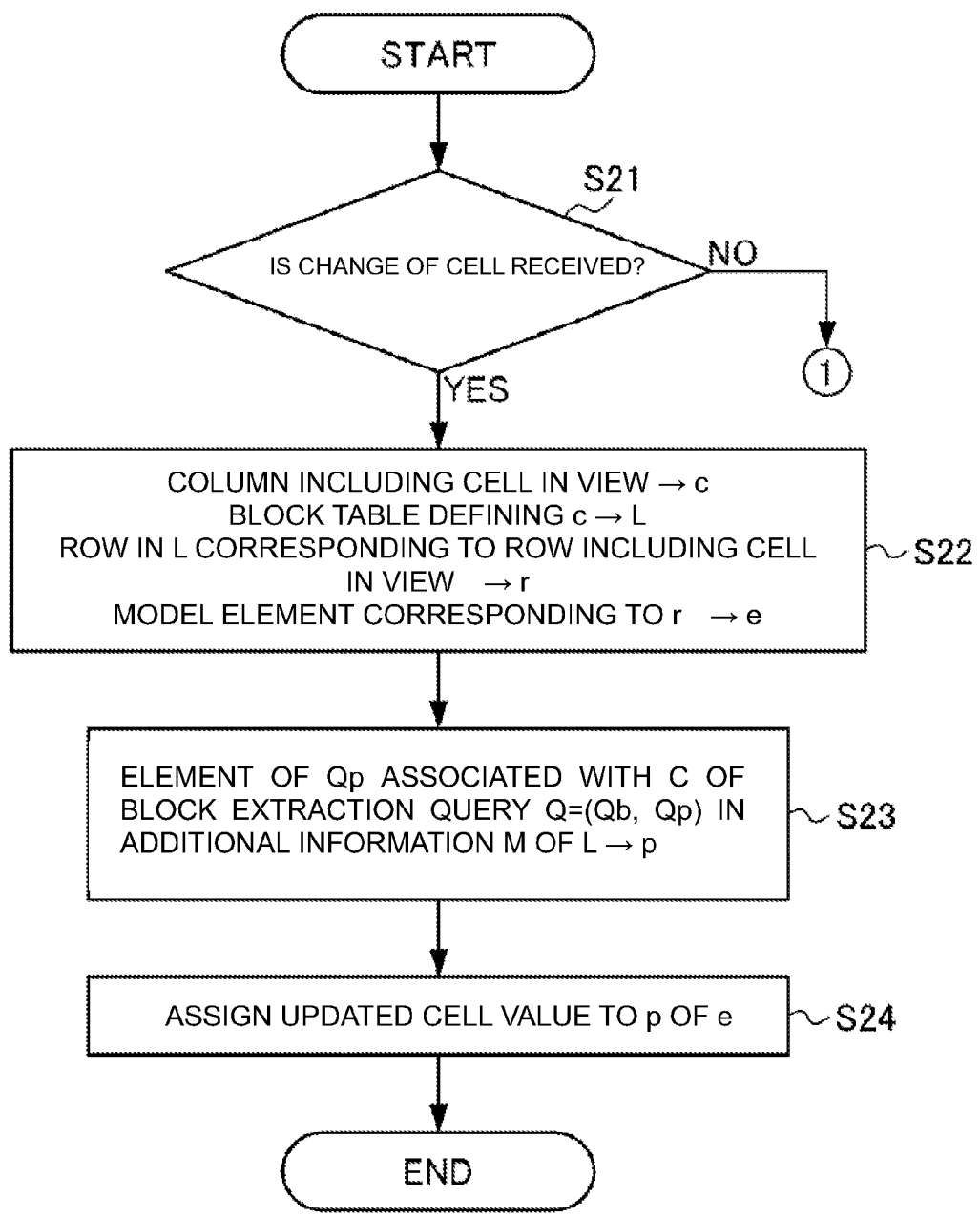
FIG. 8 shows a flowchart of model update due to a view change according to the embodiment of the present invention.
Figure 9:
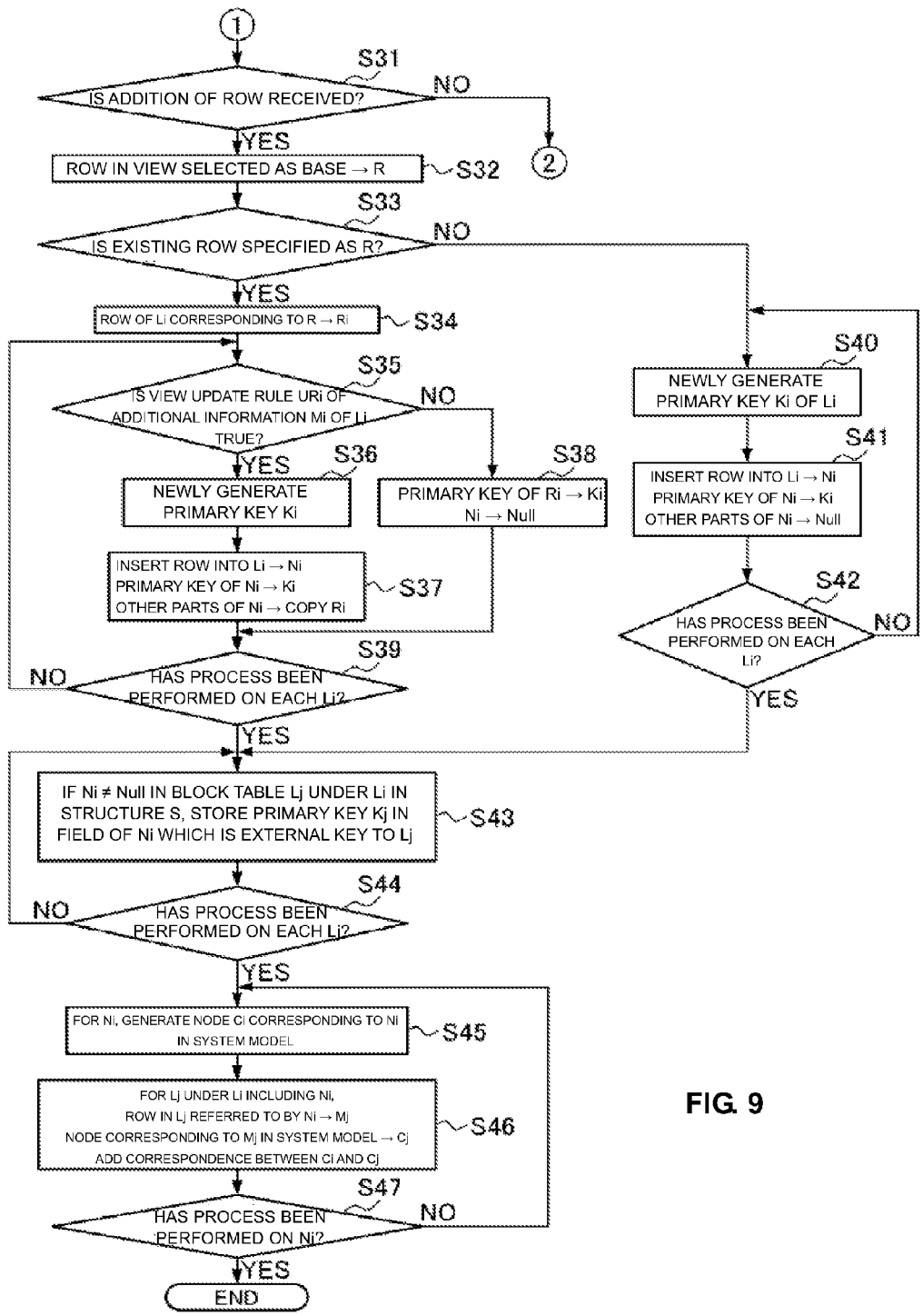
FIG. 9 shows a flowchart of the model update due to the view change according to the embodiment of the present invention.
Figure 10:
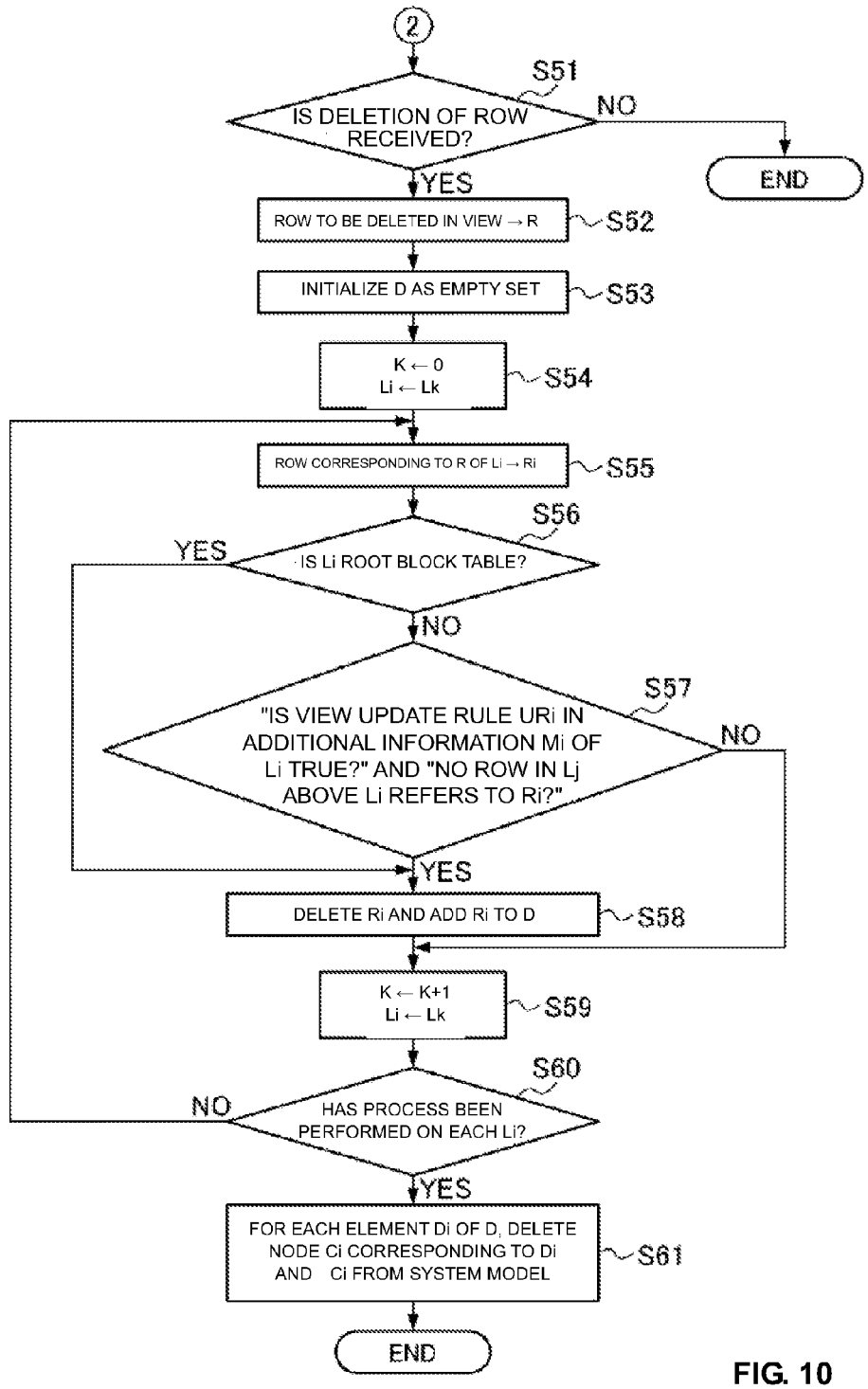
FIG. 10 shows a flowchart of the model update due to the view change according to the embodiment of the present invention.

Next, a description is given of a process to reflect change in a tabular view in the multi-dimensional data model and the graph-structured system model. FIGS. 8 to 10 are flowcharts of model update due to a view change according to this embodiment. It should be noted that the process illustrated below is controlled by the data converter 4 unless otherwise specified.

Change in Cell

In Step S21 in FIG. 8, the table presentation unit 5 determines whether or not change to a cell of the tabular view is received. If the change to the cell of the tabular view is received (Step S21: YES), the table presentation unit 5 proceeds to Step S22. If no change to the cell of the tabular view is received (Step S21: NO), the table presentation unit 5 proceeds to Step S31 in FIG. 9.

In Step S22, the column of the cell in the view is set as c, the block table of the column c is set as L, and the row of the block table L corresponding to the row of the cell in the view is set as r. The model element corresponding to the row r is set as e.

In Step S23, as for the block extraction query Q=(Qb, Qp) of the additional information M of the block table L, the element of the query Qp to the column c is set as p. In Step S24, the updated value of a cell is assigned to the property p of the model element e. Then, the process ends.

Throughout the series of processes, the data converter 4 can reflect, using the block extraction query Q given through the user's input, the information of cell change received by the table presentation unit 5, in the multi-dimensional data model in which dimensions are arranged hierarchically and also on the system model of the graph-type data structure.

Addition of Row

In Step S31 in FIG. 9, the table presentation unit 5 determines whether or not addition of a row in the tabular view is received. If the addition of the row in the tabular view (Step S31: YES) is received, the table presentation unit 5 proceeds to Step S32. On the other hand, if the addition of the row in the tabular view is not received (Step S31: NO), the table presentation unit 5 proceeds to Step S51 in FIG. 10.

In Step S32, R is set as a row of the view that is selected by the user as a base in adding a row. The selection of a base in adding a row means that the user adds a row by copying and pasting an existing row. In cases where a row is newly created, nothing is set as the row R.

Change in Cell

In Step S33, it is determined whether or not an existing row is specified as the row R. If the existing row is specified as the row R (Step S33: YES), the process proceeds to Step S34. On the other hand, if the existing row is not specified as the row R, that is, nothing is specified (Step S33: NO), the process proceeds to Step S40.

In Step S34, the row of each block table Li corresponding to the row R is set as Ri. In Step S35, with reference to the view update rule URi of additional information Mi of the block table Li, it is determined whether or not the view update rule URi is True. If the view update rule URi is True (Step S35: YES), the process proceeds to Step S36. If the view update rule URi is False (Step S35: NO), the process proceeds to Step S38.

In Step S36, the primary key of the block table Li is newly generated and is set as Ki. In Step S37, a row is inserted into the block table Li, and the row is set as a row Ni. The primary key of the row Ni is then set as Ki, and the values of the row Ri are copied to the other parts thereof. The process then proceeds to Step S39. In Step S38, the primary key of the row Ri is set as Ki and the row Ni is set to Null.

In Step S39, it is determined whether or not the process has been performed on each block table Li. If the process has been performed on each block table Li (Step S39: YES), the process proceeds to Step S43. On the other hand, if the process has not been performed on each block table Li (Step S39: NO), the process proceeds to Step S35 and performs the process on a block table Li that has not been processed.

In Step S40, the primary key of the block table Li is newly generated and is set as Ki. In Step S41, a row is inserted into the block table Li, and the row is set as the row Ni. The primary key of the row Ni is then set as Ki, and the other parts thereof are set to Null.

In Step S42, it is determined whether or not the process has been performed on each block table Li. If the process has been performed on each block table Li (Step S42: YES), the process proceeds to Step S43. On the other hand, if the process has not been performed on each block table Li (Step S42: NO), the process proceeds to Step S40 and performs the process on a block table Li that has not been processed.

In Step S43, as for the block tables Lj that are each arranged under the block tables Li in a structure S of the multi-dimensional data model, the primary key Kj of the block table Lj is stored in the field of the row Ni which is an external key to the block table Lj, if the row Ni≠Null.

In Step S44, it is determined whether or not the process has been performed on each block table Lj. If the process has been performed on each block table Lj (Step S44: YES), the process proceeds to Step S45. On the other hand, if the process has not been performed on each block table Lj (Step S44: NO), the process proceeds to Step S43 and performs the process on a block table Lj that has not been processed.

In Step S45, for each of the rows Ni, a node Ci corresponding to the row Ni is generated in the system model.

In Step S46, as for the block table Lj under the block table Li including the row Ni, the row of the block table Lj being referred to by the row Ni is set as a row Mj. Further, the node of the system model of the row Mj is set as a node Cj. Then, a correspondence is added between the node Ci and the node Cj of the system model.

In Step S47, it is determined whether or not the process has been performed on each row Ni. On the other hand, if the process has been performed on each row Ni (Step S47: YES), the process ends. On the other hand, if the process has not been performed on each row Ni (Step S47: NO), the process proceeds to Step S35 and performs the process on a row Ni that has not been processed.

Deletion of Row

In Step S51 in FIG. 10, the table presentation unit 5 determines whether or not deletion of a row in the tabular view is received. If the deletion of the row in the tabular view (Step S51: YES) is received, the table presentation unit 5 proceeds to Step S52. On the other hand, if the deletion of the row to the tabular view is not received (Step S51: NO), the table presentation unit 5 ends the process.

In Step S52, the row the user selects as the deletion target in the view is set as the row R. In Step S53, a set D which stores the deleted rows of the block table is initialized to be an empty set.

In Step S54, 0 is assigned to the integer k, and the block table Lk is set as the block table Li. The block table L0 indicates a root block table. In Step S55, the column corresponding to the row R in the block table Li is set as Ri.

In Step S56, it is determined whether or not the block table Li is the root block table. If the block table Li is a root block table (Step S56: YES), the process proceeds to Step S58. On the other hand, if the block table Li is not a root block table (Step S56: NO), the process proceeds to Step S57.

In Step S57, "with reference to the view update rule URi of additional information Mi of the block table Li, it is determined whether or not the view update rule URi is True" and whether or not "there is no row referred to the row Ri in a parent block table Lj of the block table Li." If the view update rule URi is True and if there is no row referred to the row Ri in the parent block table Lj of the block table Li (Step S57: YES), the process proceeds to Step S58. On the other hand, if the view update rule URi is False or if there is a row referred to the row Ri in the parent block table Lj of the block table Li (Step S57: NO), the process proceeds to Step S59.

In Step S58, the row Ri is deleted, and the row Ri is added to the set D.

In Step S59, the process is performed in the order of the depth priority within a tree having parent-child relationships in the block tables, therefore, k plus 1 is assigned to the integer k, and the block table Lk is set as the block table Li. The process then proceeds to Step S60.

In Step S60, it is determined whether or not the process has been performed on each block table Li. If the process has been performed on each block table Li (Step S60: YES), the process proceeds to Step S61. On the other hand, if the process has not been performed on each block table Li (Step S60: NO), the process proceeds to Step S55.

In Step S61, as for the elements Di of the set D, a node Ci corresponding to an element Di and a correspondence made with the node Ci are deleted from the system model. The element Di is one of the rows that have been deleted in the block table and stored in the set D. Then, the process ends.

Throughout the series of processes, the data converter 4 can reflect, using the view update rule UR given through the user's input, the information for the addition and deletion of a row received by the table presentation unit 5, in the multi-dimensional data model whose dimensions are arranged hierarchically and also on the system model of the graph-type data structure.

Example Application of Flowchart of Model Update Due to View Change

Next, a description is given of an example of a model update by using the flowcharts illustrated with FIGS. 8 to 10. Firstly, a description is given taking as an example a case where the "front axle" is updated into a "front axle 2" in a cell 61 of the tabular view 60 in FIG. 6 presented by the table presentation unit 5.

The block table L that defines the column of the cell 61 is set as a block table of the axle p, and the targeted row of the axle p is set as r. Thus, the row of the front axle p1 is set as r. The model element corresponding to the row r is then obtained as p1 (Step S22 in FIG. 8).

Next, with reference to FIG. 4, {name} in the block extraction query of the axle p is obtained, {name} being an element of the query Qp for the column of the cell 61. Then, a value of the updated cell is assigned to the axle name which is the property of p1 that has been obtained (Steps S23 and S24 in FIG. 8).

By the process, the "front axle" of the record of p1 in the block table 34 shown in Part (2) of FIG. 3 is updated to the "front axle 2". At the same time, in the cell 63 in the view 60 where p1 is mapped, the "front axle" is updated into the "front axle 2".

Next, a description is given of an example where a row 62 in the tabular view 60 in FIG. 6, which is presented by the table presentation unit 5, is deleted. In this example, a four-wheel vehicle is changed into a three-wheel vehicle with only one front wheel.

Firstly, the row, of the right front wheel w2, which is the row 62 is set as R, and the set D is initialized to be an empty set (Steps S52 and S53 in FIG. 10).

Next, the right front wheel w2 is deleted from the block table of the wheel w, and the right front wheel w2 is added to the set D (Step S56: YES and then Step S58).

Next, the process is performed on the block table of the axle p. In the block table of the axle p, the view update rule is True (FIG. 7). Since the block table of the wheel w, which is the parent of the block table of the axle p, includes the left front wheel w1 referring to the front axle p1, there is a row referring to the deleted row (Step S57: NO in FIG. 10). Thus, no row is deleted from the block table of the axle p.

Similarly, since the view update rule is False in each of the block tables of the steering s, the hydraulic piping t, and the vehicle body u (FIG. 7) (Step S57: NO in FIG. 10), no row is deleted from the block table of the block tables of the steering s, the hydraulic pining t, and the vehicle body u.

Throughout the processes so far, the deletion process for the multi-dimensional data model has been completed. In addition, the node of the right front wheel w2 of the set D and its correspondence are deleted (Step S61 in FIG. 10). When this process is performed, the deletion process on the system model is completed.

Process of Rewriting Updated Multi-dimensional Data Model to System Model

Next, a description is given of a process of rewriting an updated multi-dimensional data model to the graph-structured system model. The tabular view is generated from the multi-dimensional data model, and, then, with reference to the tabular view, thereby, constraints from the axle viewpoint and the hydraulic piping viewpoint can be described, for example, in the exemplary wheel model in FIG. 2. As examples of the constraints, the following can be cited:
(Constraint 1) SUM (a breaking force of a wheel of "hydraulic piping A=t1">maximum torque on wheel);
(Constraint 2) SUM (a breaking force of a wheel of "hydraulic piping B=t2">maximum torque on wheel); and
(Constraint 3) SUM (the maximum load of a wheel of "front axle=p1">constant K).
The constraint 1 implies that the wheel must be controllable even by the hydraulic piping A (t1) only. The constraint 2 implies that the wheel must be controllable even by the hydraulic piping B (t2) only. The constraint 3 implies that the maximum load of the two front wheels must be higher than a certain value. The constraint 3 is set in consideration of the weight of an engine located in a front part. As described, the multi-dimensional data model is useful in analysis/description based on multiple viewpoints. These constraints can be described with an SQL query.

Figure 11:
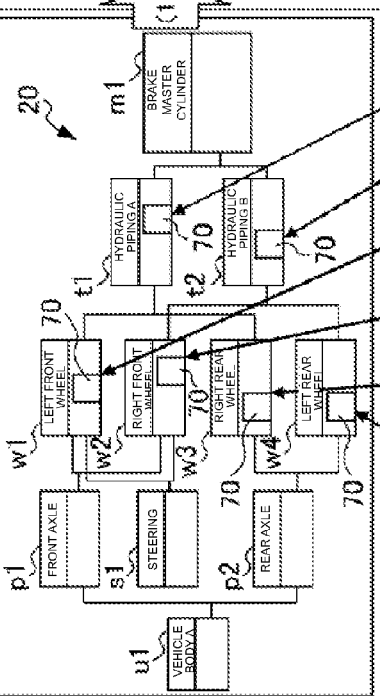
FIG. 11 shows a diagram illustrating an outline of a conversion among a graph-structure system model, a multi-dimensional data model and a tabular view, according to the embodiment of the present invention.

Next, a description is given of how such constraints are converted into Parametric Diagram (PD) of SysML. FIG. 11 is a diagram illustrating an outline of a conversion among the graph-structure system model, the multi-dimensional data model and the tabular view, according to this embodiment. Note that the process of converting the constraints into SysML PD does not assume the conversion of the constraint expressions themselves. For instance, when the constraints are described as formulas of a spreadsheet, it is naturally be preferable in the SysML in some cases that constraint expressions be described in OCL and Java (Registered Trademark) and the like which are constraint languages. However, such conversion is not assumed in this example. The processes to be described below are to generate constraint properties and constraint blocks which correspond to cells of SysML PD and the range of the cells, and constraint elements assigned thereto, by utilizing rules of association between individual constraint expressions defined in advance, such as OCL and Java, and rules of the formulas of the spreadsheet.

Example of Conversion into Graph-Structured System Model

In this example, the graph model 20 to be a target of the conversion, which is illustrated in FIG. 11 is an IBD (Internal Block Diagram). Throughout the processes in FIG. 5, the tabular view 60 is generated on the basis of the IBD (see (1) in the figure). If the tabular view 60 describes a constraint expression such as "total weight of all the wheels is equal to or less than a certain value (e.g., XX kgs), for example, the constraint expression is selected to convert the constraint expression into SysML PD (see (2) in the figure).

Figure 12:
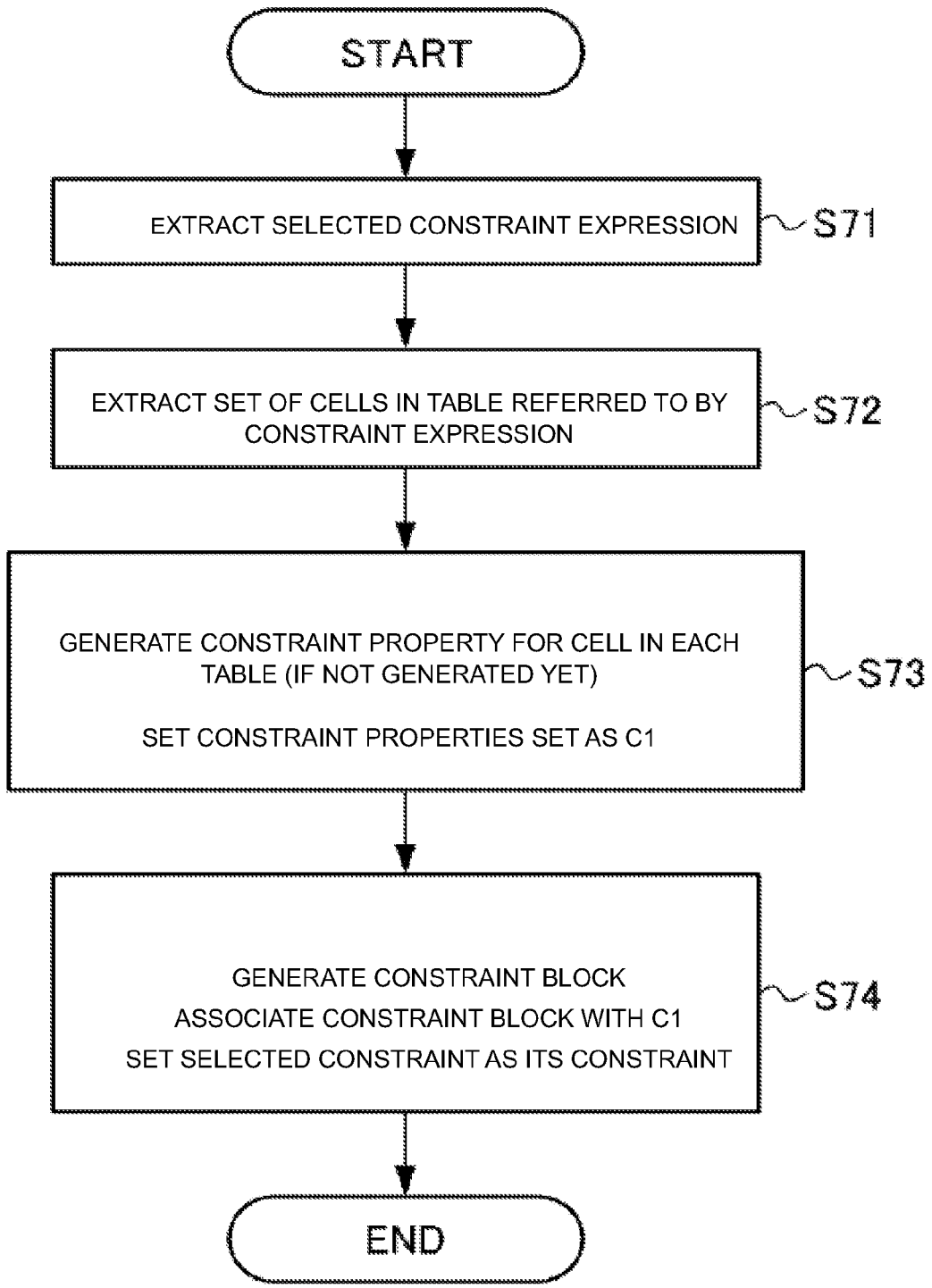
FIG. 12 shows a flowchart of SysML PD generation according to the embodiment of the present invention.

FIG. 12 is a flowchart of SysML PD generation according to this embodiment. Note that the following processes are controlled by the data converter 4.

In Step S71, a constraint expression selected by the user is extracted. The constraint expression is in advance described in the tabular view. In Step S72, a set of cells in the table, being referred to by the constraint expression, are extracted. In Step S73, if a constraint property 71 of a property 70 corresponding to each of the cells of the tables is not yet generated, a constraint property 71 is generated. Then, a set of constraint properties 71 is set as a node C1.

In Step S74, a constraint block 72 is generated. The node C1 is associated with the constraint block 72, and the selected constraint expression is set as a constraint 73. Then, the process ends.

According to the present invention, the model converter 1 generates a multi-dimensional data model for the complicated graph-structured system model and provides a tabular view, and thus the analysis and editing can be performed hierarchically from multiple viewpoints with reference to tables. In describing constraints in a general-purpose graphical modeling language such as SysML, correspondences need to be described to all the properties for the constraints. For example, it requires huge burden to describe the constraints that are influential to the large number of components. In the present invention, a snowflake schema is applied to the complicated graph-structured system model in the model converter 1, and thus the table can be generated properly based on the OLAP technique. Therefore, it is easy to describe constraint expressions for a large number of properties in the table format in the model converter 1. That is because the properties can be grouped in a unit of columns and rows of the table. The editing can be performed in the table format. The large number of properties can be listed in the table format to edit the model.

Example Application of Large-Scale System Model

Figure 13:
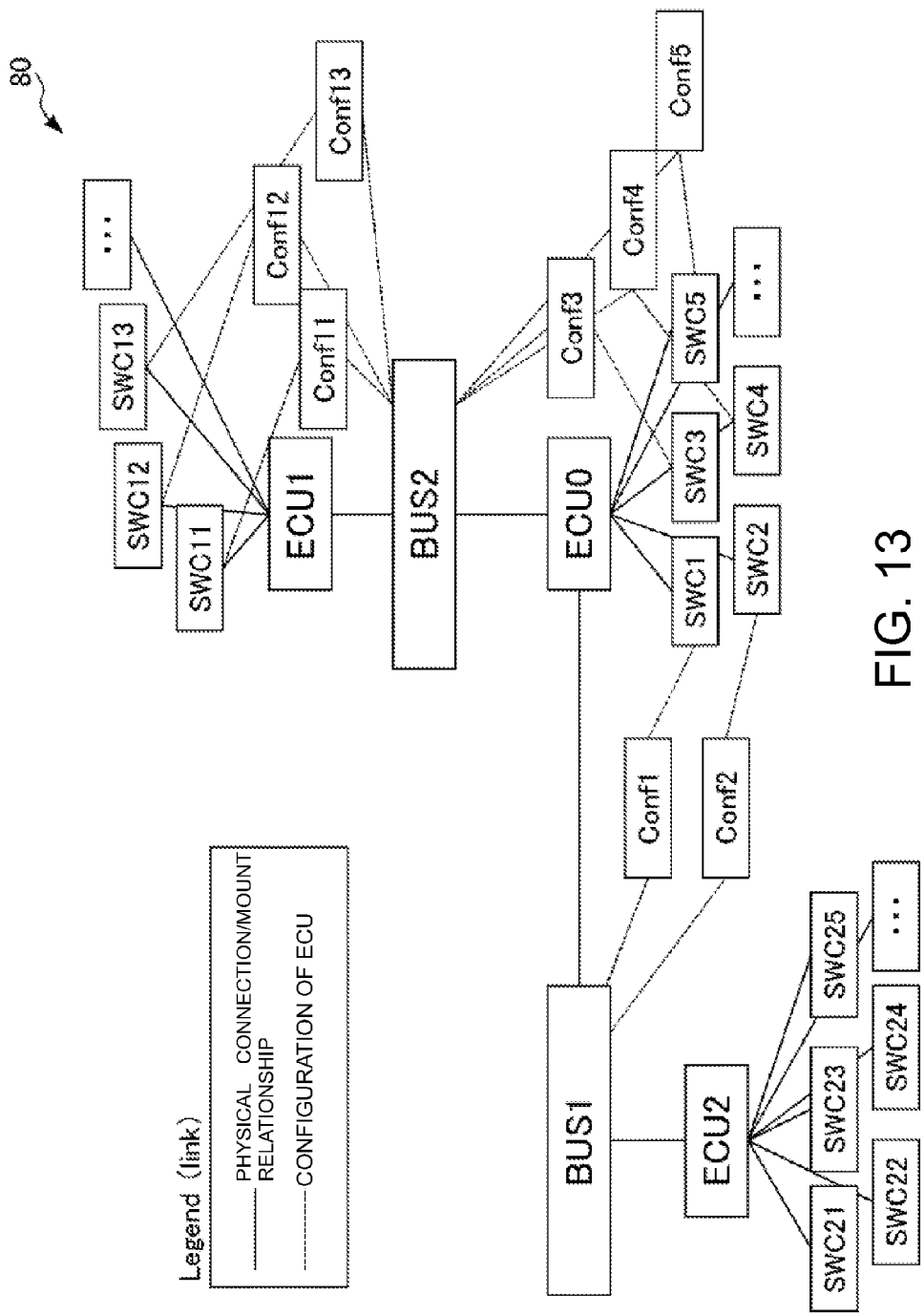
FIG. 13 shows a diagram illustrating an example of a system model according to the embodiment of the present invention.

Next, a discussion is made on assignments to a in-vehicle communication bus (BUS) of an in-vehicle software component (SWC), as an example application of analysis/editing to a large-scale system model. FIG. 13 is a diagram illustrating an example of a graph model 80 according to this embodiment.

The graph model 80 in FIG. 13 is a graph-structured system model including several tens of thousands of SWCs, BUSes and ECUs (Engine Control Units) installed in an automobile. In the graph model 80, SWC blocks SWC1, SWC2, SWC3, . . . which represent SWCs are connected to ECU blocks ECU0, ECU1, ECU2, . . . which represent ECUs, and BUS1, BUS2, . . . are connected to the ECUs. BUS is used for communication is specified by using a corresponding one of configurations Conf1, Conf2, . . . for each of the SWCs.

Figure 14:
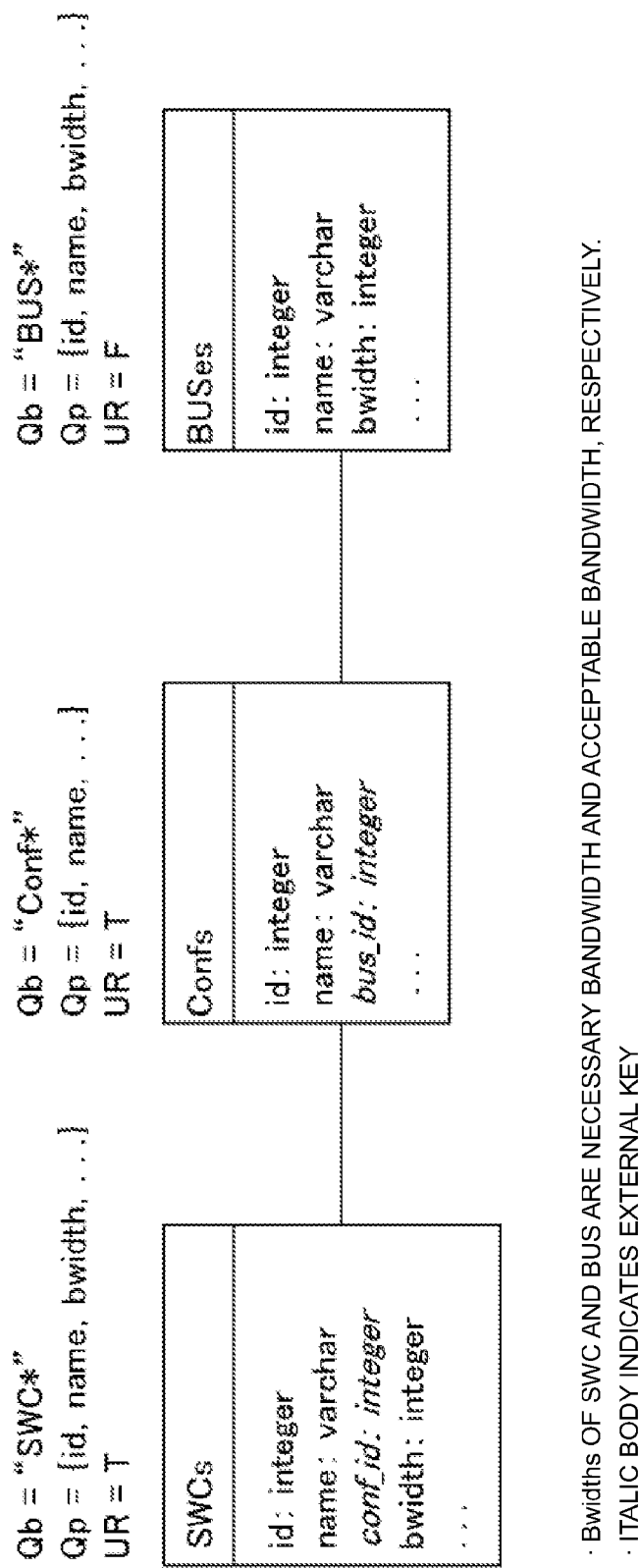
FIG. 14 shows a diagram illustrating an example of a structure of the multi-dimensional data model and additional information thereof according to the embodiment of the present invention.
Figure 15:
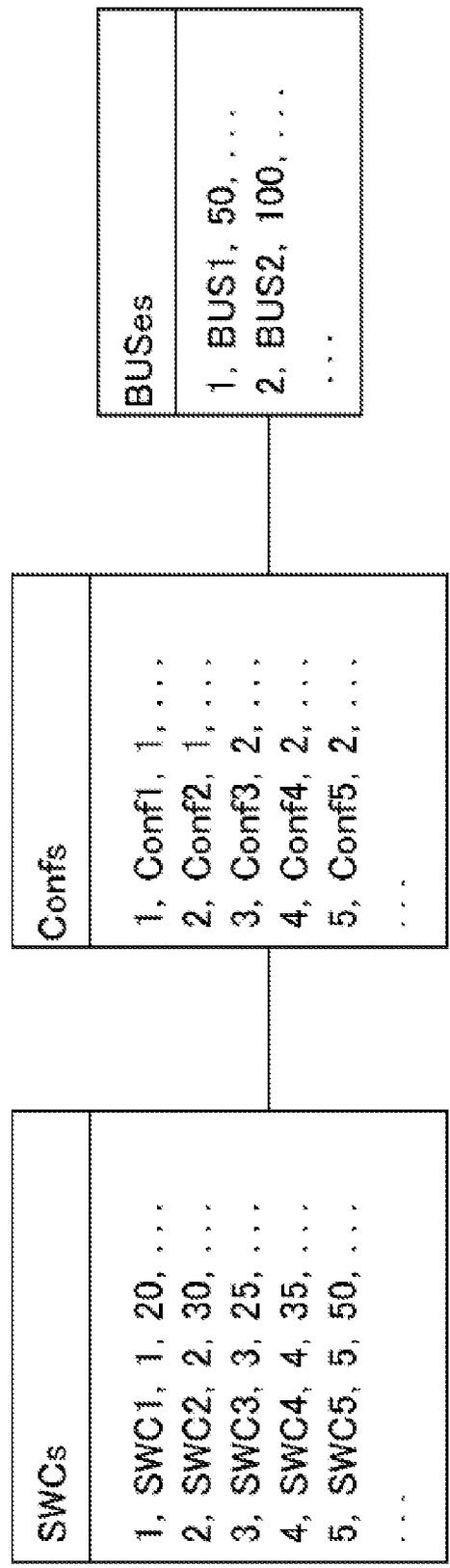
FIG. 15 shows a diagram illustrating an example of contents of a table corresponding to the multi-dimensional data model according to the embodiment of the present invention.

Next, an example is shown in which the graph model 80 is analyzed/edited from a viewpoint of necessity/acceptability of the necessary bandwidth for the SWC and BUS. FIG. 14 is a diagram illustrating an example of a structure of the multi-dimensional data model and additional information thereof according to this embodiment. FIG. 15 is a diagram illustrating an example of contents of a table corresponding to the multi-dimensional data model according to this embodiment. FIG. 16 is a table illustrating an example of a table according to this embodiment, which is presented to the user.

FIG. 14 illustrates: the snowflake schema showing the structure of the multi-dimensional data model; and as the additional information thereof, block extraction queries and view update rules. In this schema, SWCs, Confs, and BUSes are defined as block tables to extract a SWC, a configuration, and a BUS, and the root block table which is the center of the analysis is SWCs. A piece of information to extract a SWC, a configuration, or a BUS is given to a corresponding one of the tables as the block extraction query Q=(Qb, Qp). The table is given information of the view update rule as to whether or not the addition/deletion is to be performed in the table when a record is added or deleted in an upper-level table. According to the view update rule in this example, when an SWC is added or deleted, a configuration record is also added or deleted (the view update rule UR of the Confs table=T), but a BUS record is not added nor deleted (view update rule of the BUSes table=F).

As illustrated in FIG. 15, records are added to the SWCs, Confs and Buses tables according to the flowchart of FIG. 5 described above. By joining these tables together, a tabular view 90 is obtained as illustrated in FIG. 16.

For example, all the SWCs connected to the BUS2 can be displayed in this tabular view 90, and thus the total amount of the necessary bus bandwidth (bwidth) can be checked. For example, if the necessary bus bandwidth is much lower than the acceptable amount of the BUS2 as the result of the checking, the user can take a remedy such as cost reduction by lowering the bandwidth of the BUS2. Furthermore, the total amount of the necessary bus bandwidths of the SWCs connected to the BUS1 and the BUS2 can be compared with each other thereby to perform analysis and editing in such a manner as to adjust the bus bandwidths among SWCs.

The range narrowed down with a specific condition is referred to in the table as described above. Thereby, the system model can be analyzed from different viewpoints, and intensive constraints or the like referring to the range of the table can be described efficiently.

In the case of this example, the viewpoints are different in the sense that an object matching under the search condition within the same tables (BUSes) is BUS 1 or BUS 2. In general, specifying a relationship between tables, like the relationship between the axle and the hydraulic piping in FIG. 6 enables the analysis and the editing from various viewpoints.

Hardware Configuration of Model Converter 1

Figure 17:
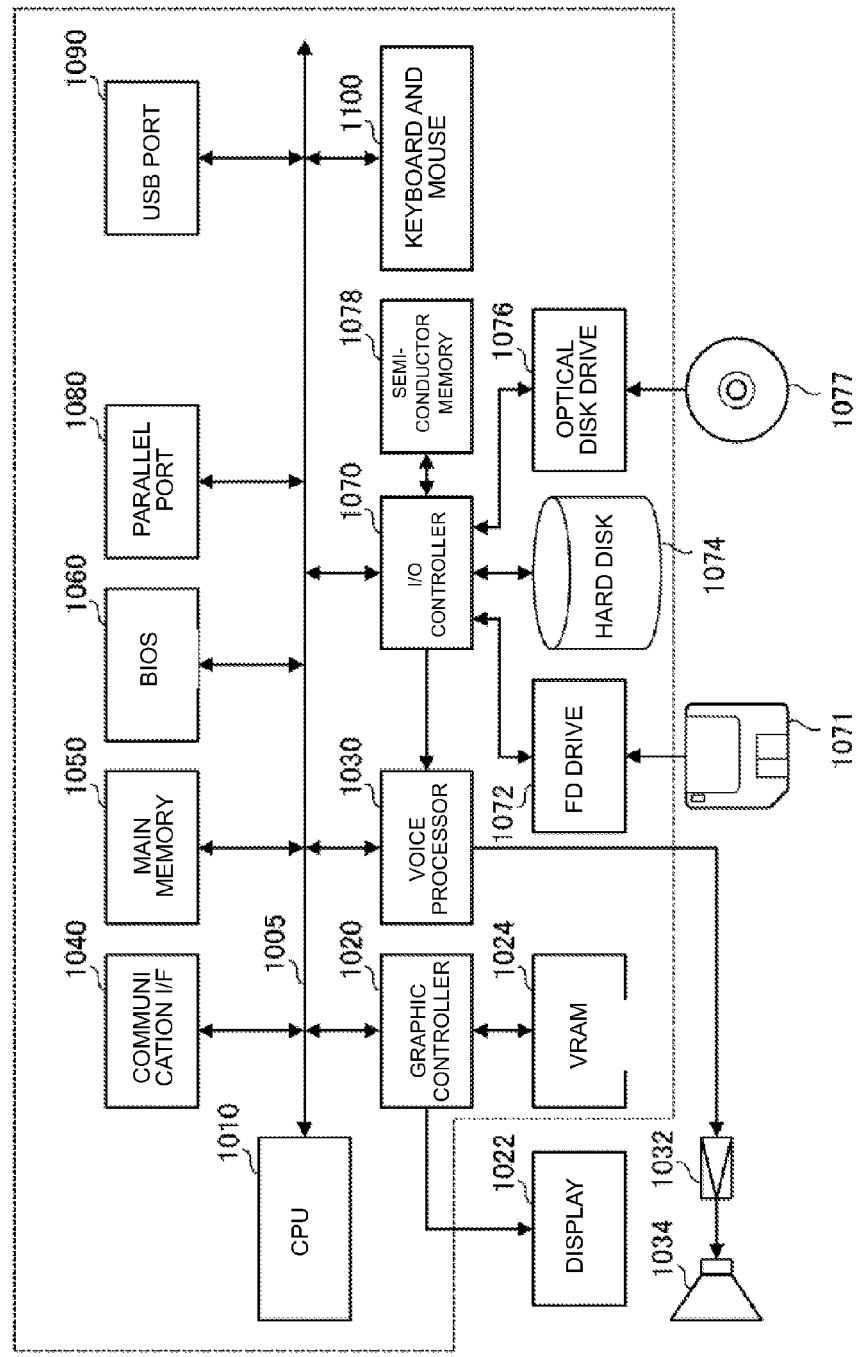
FIG. 17 shows a diagram illustrating a hardware configuration of a model converter according to the embodiment of the present invention.

FIG. 17 is a diagram illustrating a hardware configuration of the model converter 1 according to this embodiment. An overall configuration is described below on the assumption that the model converter 1 is an information processing apparatus represented by a computer. However, it goes without saying that in a case of a specialized machine or an embedded apparatus, a minimum required configuration can be selected depending on its environment.

The model converter 1 includes a CPU (Central Processing Unit) 1010, a bus line 1005, a communication I/F 1040, a main memory 1050, a BIOS (Basic Input Output System) 1060, a parallel port 1080, a USB port 1090, a graphic controller 1020, a VRAM 1024, a voice processor 1030, an I/O controller 1070, and input means such as a keyboard/mouse adapter 1100. Storage means such as a flexible disk (FD) drive 1072, a hard disk 1074, an optical disk drive 1076, and a semi-conductor memory 1078 can be connected to the I/O controller 1070.

A display 1022 is connected to the graphic controller 1020. Further, an amplifying circuit 1032 and a speaker 1034 are connected to the voice processor 1030.

The BIOS 1060 stores therein boot programs that are executed by the CPU 1010 on a startup of the model converter 1 and programs that are dependent on the hardware of the model converter 1. The FD (Flexible Disk) drive 1072 reads programs or data from the flexible disk 1071 and provides the programs or the data to the main memory 1050 or the hard disk 1074 via the I/O controller 1070. FIG. 17 illustrates an example where the model converter 1 includes the hard disk 1074 therein. However, a hard disk can be connected or additionally set up outside the model converter 1 with an external device connection interface (not shown) connected to the bus line 1005 or the I/O controller 1070.

As the optical disk drive 1076, for example, a DVD-ROM drive, a CD-ROM drive, a DVD-RAM drive, a BD(Blu-ray Disk)-ROM drive or the like can be used. In this case, the optical disk 1077 compatible with the drive needs to be used. The optical disk drive 1076 can also read programs or data from the optical disk 1077 and then provide the programs or the data to the main memory 1050 and the hard disk 1074 via the I/O controller 1070.

The computer programs provided for the model converter 1 are stored in a storage medium such as the flexible disk 1071, the optical disk 1077 or the memory card and provided by the user. The computer programs in the storage medium are read via the I/O controller 1070 or downloaded via the communication I/F 1040, and thereby installed and executed in the model converter 1. Operations in which the computer programs cause the information processing apparatus to perform are the same as those described before, and therefore the descriptions about these operations are omitted.

The computer programs can be stored in an external storage medium. As the storage medium, a magneto optical storage medium such as an MD or a tape medium can be used in addition to the flexible disk 1071, the optical disk 1077, or a memory card. Furthermore, a storage device, such as a hard disk or an optical disk library, provided in a server system connected to the Internet or a dedicated communication line can be used as the storage medium, and the computer programs can be provided for the model converter 1 via the communication line.

The description of the example above has been given mainly of the model converter 1. Further, the same functions of the information processing apparatus described above can be implemented by installing programs having the above-mentioned functions to operate a computer as the information processing apparatus. Therefore, the information processing apparatus according to one embodiment of the present invention that has been described above can be achieved by a method or a computer program therefor.

The apparatus can be achieved with hardware, software, or a combination of hardware and software. In a case of an implementation with a combination of hardware and software, a typical example of implementation is a computer system including predetermined programs. In this case, the predetermined programs are loaded onto the computer system and executed, and, accordingly, the program causes the computer system to execute the processes according to the present invention. The program is configured of a set of instructions that are written in any language, code or expression. Such a set of instructions enables specific functions to be executed after direct execution by the system or after one of or both (1) a conversion into another language, code, or expression or (2) copying thereof to another medium. As a matter of course, the present invention includes in the range therein not only such a program itself but also a program product including a medium storing the program. The program to implement the functions of the present invention can be stored in any computer readable medium such as a flexible disk, an MO, a CD-ROM, a DVD, a hard disk device, a ROM, a RAM, an M-RAM (Magnetoresistive RAM) and a flash memory. Such a program can be downloaded from another computer system connected via the communication line or be copied them from another medium so as to be stored in the computer readable medium. Furthermore, the program can be compressed or divided into multiple pieces and then stored in a single or multiple storage mediums.

The present invention has been described above with reference to the embodiment. However, the present invention is not limited to the embodiment described above. The effects of the present invention described in the embodiment merely enumerate the most preferable effects originated from the present invention. The effects of the present invention are not limited to those described in the embodiments or the example applications of the present invention.

The invention claimed is:

1. A method of converting a system model with use of a computer in order to facilitate analysis and editing of the system model, the method comprising the steps of:
    receiving an input of a conversion processing description about a hierarchical multi-dimensional data model structure and extraction queries wherein said hierarchical multi-dimensional data model structure and said extraction queries extract at least one element from a plurality of model elements comprising a graph-type data structure of a graph model of the system model; and
    generating a hierarchical multi-dimensional data model from the graph model stored in a graph model storage unit on the basis of said inputted conversion processing description, wherein said hierarchical multi-dimensional data model comprises dimensions having a hierarchical relationship.

2. The method according to claim 1, the method further comprising the step of:
    specifying in advance, at least one of said plurality of model elements corresponding to a root block table, wherein said root block table is a center table of said multi-dimensional data model structure.

3. The method according to claim 2, wherein said step of generating a hierarchical multi-dimensional data model further comprises the step of:
    generating said hierarchical multi-dimensional data model from said plurality of model elements, wherein said plurality of model elements are extracted by said extraction queries that apply a first block table associated with said specified root block table and a second block table associated with said first block table.

4. The method according to claim 1, wherein said step of receiving an input of a conversion processing description further comprises the step of:
    receiving a description with an applied snowflake schema.

5. The method according to claim 1, wherein said graph model is obtained by modeling at least one of: a graph-type data structure, a behavior, a constraint of a system, and combinations thereof.

6. The method according to claim 1, further comprising the steps of:
    generating a tabular view from said hierarchical multi-dimensional data model; and
    outputting said tabular view.

7. The method according to claim 6, wherein said step of outputting said tabular view further comprises the steps of:
    filtering specific information to be outputted; and
    receiving filtered information, wherein
    said tabular view is outputted based on said filtered information.

8. The method according to claim 6, further comprising the steps of:
    receiving an input of changed information for said tabular view;
    receiving an input of said conversion processing description with a view update rule, wherein said view update rule is a rule for an update of said hierarchical multi-dimensional data model; and
    reflecting a content of said changed information in said hierarchical multi-dimensional data model, wherein said hierarchical multi-dimensional data model complies with said conversion processing description.

9. The method according to claim 6, further comprising the steps of:
    receiving an input of changed information for said tabular view;
    receiving an input of said conversion processing description with a view update rule, wherein said view update rule is a rule for an update of said hierarchical multi-dimensional data model; and
    reflecting a content of said changed information in said hierarchical multi-dimensional data model stored in a multi-dimensional data model storage unit, wherein said hierarchical multi-dimensional data model complies with said conversion processing description.

10. The method according to claim 6, further comprising the steps of:
    receiving a constraint expression description based on said outputted tabular view;
    obtaining a predefined association rule for associating said hierarchical multi-dimensional data model and said graph model with each other; and
    updating said graph model stored in graph model storage unit on the basis of said received constraint expression description by using said predefined association rule.

11. The method according to claim 8, further comprising the step of:
    using said extraction queries as said conversion processing description, wherein said changed information comprises a change of a value of a cell in said tabular view.

12. The method according to claim 8, further comprising the step of:

using said view update rule as said conversion processing description, wherein said changed information comprises adding or deleting at least one row from said tabular view.

13. A computer readable storage device embodying computer readable instructions which, when executed, cause a computer to carry out the steps of:

receiving an input of a conversion processing description about a hierarchical multi-dimensional data model structure and extraction queries wherein said hierarchical multi-dimensional data model structure and said extraction queries extract at least one element from a plurality of model elements comprising a graph-type data structure of a graph model of the system model; and generating a hierarchical multi-dimensional data model from the graph model stored in a graph model storage unit on the basis of said inputted conversion processing description, wherein said hierarchical multi-dimensional data model comprises dimensions having a hierarchical relationship.

14. A system model converter that facilitates analysis and editing of a system model, the system model converter comprising:

a graph model storage unit comprising hardware configured to store a graph model with a graph-type data structure and a plurality of model elements;

a conversion processing description input unit comprising hardware configured to receive input of a conversion processing description about a hierarchical multi-dimensional data model structure and extraction queries, wherein said hierarchical multi-dimensional data model structure and said extraction queries extract at least one element from the plurality of model elements comprising a graph-type data structure of a graph model of the system model; and a data converter comprising hardware configured to generate a hierarchical multi-dimensional data model from the graph model stored in a graph model storage unit on the basis of said inputted conversion processing description, wherein said hierarchical multi-dimensional data model comprises dimensions having a hierarchical relationship.

* * * * *